US008628679B2

(12) United States Patent
DeSanto et al.

(10) Patent No.: US 8,628,679 B2
(45) Date of Patent: Jan. 14, 2014

(54) HIGH-DEFINITION DEMETALIZATION PROCESS

(75) Inventors: Ronald F. DeSanto, Darien, IL (US); Norma D. Kammerer, Bloomingdale, IL (US); Anton Zagajowski, III, Yorkville, IL (US)

(73) Assignee: Phoenix Inks and Coatings, LLC, Darien, IL (US)

( * ) Notice: Subject to any disclaimer, the term of this patent is extended or adjusted under 35 U.S.C. 154(b) by 117 days.

(21) Appl. No.: 13/010,341

(22) Filed: Jan. 20, 2011

(65) Prior Publication Data

US 2011/0174771 A1 Jul. 21, 2011

Related U.S. Application Data

(60) Provisional application No. 61/296,759, filed on Jan. 20, 2010.

(51) Int. Cl.
*B44C 1/22* (2006.01)
*C03C 15/00* (2006.01)
*C03C 25/68* (2006.01)
*C23F 1/00* (2006.01)

(52) U.S. Cl.
USPC .......................................... 216/91

(58) Field of Classification Search
USPC .................................. 216/91, 92, 32, 13
See application file for complete search history.

(56) References Cited

U.S. PATENT DOCUMENTS

| 4,263,354 A | 4/1981 | Westermann |
| 4,938,990 A * | 7/1990 | Beckett .................. 427/466 |
| 6,549,131 B1 | 4/2003 | Cote et al. |
| 7,427,360 B2 * | 9/2008 | Hopper et al. ............. 216/13 |
| 2004/0029044 A1 * | 2/2004 | Severance et al. .......... 430/281.1 |
| 2004/0160466 A1 * | 8/2004 | Annacone ................. 347/2 |
| 2005/0046573 A1 | 3/2005 | Velasco et al. |
| 2006/0105111 A1 * | 5/2006 | Watanabe ............... 427/421.1 |
| 2008/0024917 A1 | 1/2008 | Hynes |
| 2009/0266788 A1 * | 10/2009 | Chang et al. ............. 216/17 |

* cited by examiner

*Primary Examiner* — Roberts Culbert
(74) *Attorney, Agent, or Firm* — Clark Hill PLC

(57) ABSTRACT

A method of producing images on a metalized substrate is described. The metalized substrate comprises a substrate having a top side and a bottom side and a metalized coating adhered to the top side of the substrate. The method comprises the steps of printing an image onto the metalized coating by selectively applying a protective coating of the image, curing the protective coating, applying a demetalizing solution onto the metalized substrate, rinsing the metalized substrate, drying the metalized substrate, applying an adhesive coating onto the metalized substrate, and removing the adhesive coating.

33 Claims, 4 Drawing Sheets

HIGH-DEFINITION DEMETALIZATION PROCESS

PRIORITY

This application claims priority from U.S. Provisional Patent Application No. 61/296,759, filed Jan. 20, 2010, the disclosure of which is incorporated herein by reference.

BACKGROUND OF THE INVENTION

This invention relates to the production of precise images within metalized film substrates. It was known in the prior art to create images on metalized film substrates. One method was to print caustic fluid onto the substrate to erode the metal in the areas where the caustic fluid was printed, and then to rinse the caustic off the substrate to stop the process. The areas not printed with caustic fluid remained metallic and formed the desired image. This method did not work well for fine images, as the caustic fluid tended to "creep", or to erode fine lines before the rinsing step could begin.

Another known method was to print a coating on the metalized film substrate and then to floodcoat the substrate with a caustic fluid. The caustic fluid eroded the metal in the areas where the coating was not printed. This method did not creep as much as the method described above. The coating, however, was not removable, so problems arose with this latter method if the substrate had to be laminated to another material, as the coating tended to create delamination problems between the two films. Additionally, if the final application involved packaged material that was incompatible with the coating, such as food or fragrances, this latter method was not available.

The method of the present invention ameliorates these problems.

BRIEF SUMMARY OF THE INVENTION

In accordance with the foregoing, the preferred embodiment of the method of the present invention produces images on a metalized substrate comprising a substrate and a metalized coating adhered to the substrate, by printing an image onto the metalized coating by selectively applying a protective coating of the image, curing the protective coating, applying a demetalizing solution onto the metalized substrate, rinsing the metalized substrate, drying the metalized substrate, applying an adhesive coating onto the metalized substrate, and removing the adhesive coating.

BRIEF DESCRIPTION OF THE SEVERAL VIEWS OF THE DRAWINGS

The organization and manner of the structure and operation of the invention, together with further objects and advantages thereof, may best be understood by reference to the following description, taken in connection with the accompanying non-scale drawings, wherein like reference numerals identify like elements in which.

DETAILED DESCRIPTION OF THE PREFERRED EMBODIMENTS OF THE INVENTION

Figure 1:
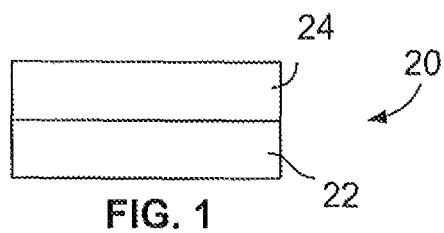
FIG. 1 is a side view of a metalized substrate used in the preferred embodiment of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The metalized substrate used in the method of the preferred embodiment is shown at various stages in FIGS. 1 through 5. In FIG. 1, a metalized film 20 comprises a substrate 22 and a metalized coating 24. Substrate 22 is preferably a plastic film, such as polyester film or polyethylene terephthalate film. Metalized coating 24 is preferably aluminum that has been statically charged to substrate 22. Other coatings include copper and other metals that can be adhered to a substrate. Metalized film 20 is preferably a roll feeding a web press, but metalized film 20 can also be sheets, cards, or other sizes.

Figure 2:
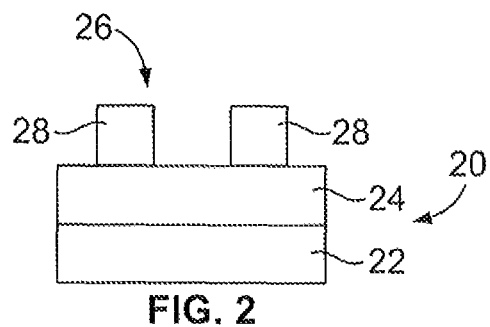
FIG. 2 is a side view of the metalized substrate of FIG. 1 with an image printed thereon.

As shown in FIG. 2, an image 26 has printed onto metalized coating 24. Preferably, image 26 is printed using a flexographic printing process, most preferably flexography. This step can also be performed by a rotogravure printing process, offset, dry offset, or screen printing. Image 26 is printed by selectively exposing metalized coating 24 to a protective coating 28. Metalized film 20 is then exposed to ultraviolet light to cure protective coating 28.

Protective coating 28 is preferably a UV epoxy-based ink. It has to resist caustic, as a caustic fluid is used for a demetalizing step as will later be described. If the ink does not resist caustic, the ink will be eroded by the caustic fluid, or the caustic fluid will migrate, or "creep", under the ink and corrode the metal coating 24 of metalized film 20. The ink also must be removable and it should be brittle. The inventors have found the UV Flexo Delamination Protective Inks, commercially available from Spectra Color Corporation, 615 N. Enterprise St., Aurora, Ill., formula number UF6-1004 and formula number UF6-1006, meet these requirements In the next step, a demetalizing solution is applied to metalized film 20, preferably using a flexographic printing process. This step can also be performed by a rotogravure printing process, offset, dry offset, or screen printing. The demetalizing solution can be any commercially available material suitable for removing metalizing coating 24 from substrate 22. Preferably, the demetalizing solution is a caustic solution, 40 percent by weight sodium hydroxide, 10 percent by weight water, and 50 percent by weight propylene glycol.

Figure 3:
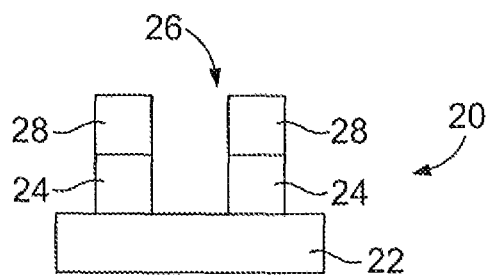
FIG. 3 is a side view of the metalized substrate of FIG. 2 after demetalizing.

The demetalizing solution removes metalized coating 24 from all areas not protected by protective coating 28, as shown in FIG. 3. Metalized film 20 is then rinsed, preferably with neutral water, and dried.

Figure 4:
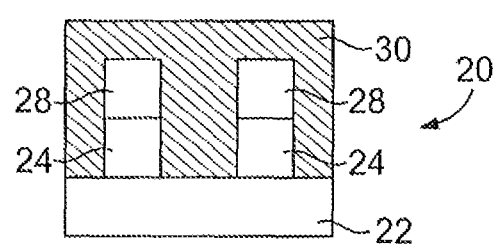
FIG. 4 is a side view of metalized substrate of FIG. 3 with an adhesive coating applied thereto.

In the next step, an adhesive coating 30 is applied to metalized film 20. Adhesive coating 30 covers exposed areas of substrate 22 and image areas formed of metalized coating 24 and protective coating 28, as shown in FIG. 4. Adhesive coating 30 can be applied by one of two methods. In one embodiment, a pressure-sensitive substrate to which adhesive coating 30 is adhered is married to metalized film 20. In another embodiment, adhesive coating 30 is applied by floodcoating, either on metalized film 20 or on a removable barrier backing, and marrying the metalized film and removable barrier backing.

The removal of adhesive coating 30 can be can be performed in-line or at a later date. In some embodiments, after adhesive coating 30 has been applied, the pressure-sensitive substrate or the removable barrier backing is removed in-line. In other embodiments, metalized film 20 is rewound into a roll and stored or shipped to a customer. At a later time, adhesive coating 30 is removed by removal of the pressure-sensitive substrate or the removable barrier backing, either by the original preparer or by a customer.

Figure 5:
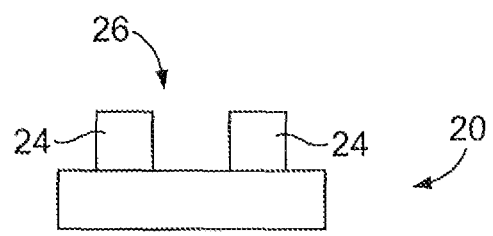
FIG. 5 is a side view of the metalized substrate of FIG. 4 after removal of the adhesive coating.

The inventors have found, surprisingly, that removal of adhesive coating 30 also removes protective coating 28, as shown in FIG. 5. The only coating left on substrate 22 is therefore metalized coating 24 in image areas 26. Image areas 26 can be very fine detailed images made of metal without any coatings or chemical residue. Metalized film 20, if in a roll, is then rewound at this point into a final roll and shipped for final use.

Figure 11:
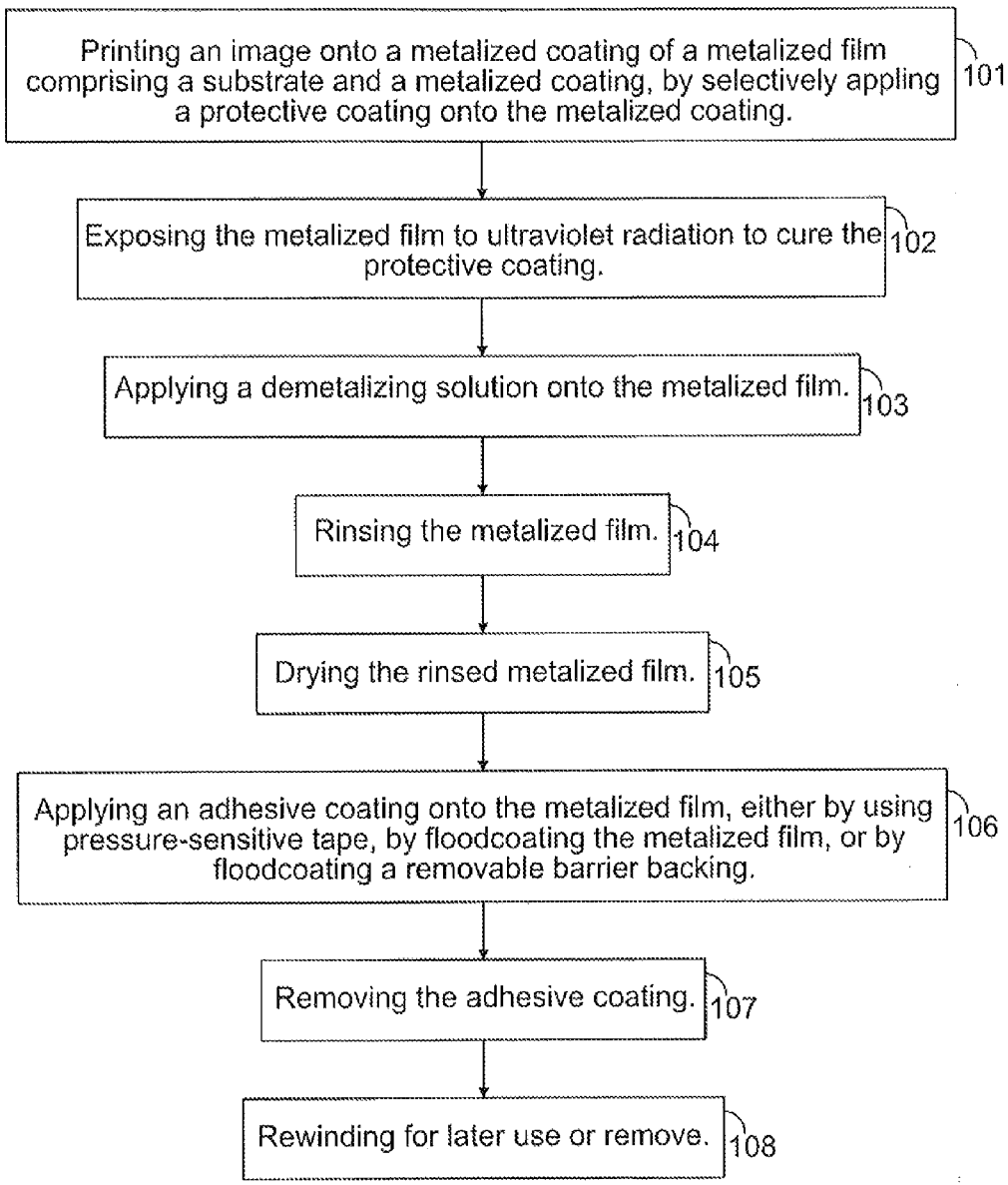
FIG. 11 is a flow chart of the method of the preferred embodiment of the present invention.

The steps of the method of the preferred embodiment can be performed in-line in a single-pass process, such as on a web press or other similar process at speeds at or around 600 feet per minute, or can be performed as a batch process. The method of the preferred embodiment of the present invention is shown in the flow chart diagrammed in FIG. 11. The steps comprise:

Step 101. Printing an image onto a metalized coating of a metalized film comprising a substrate and a metalized coating, by selectively applying a protective coating onto the metalized coating.

Step 102. Exposing the metalized film to ultraviolet radiation to cure the protective coating.

Step 103. Applying a demetalizing solution onto the metalized film, preferably a caustic solution.

Step 104. Rinsing the metalized film.

Step 105. Drying the rinsed metalized film.

Step 106. Applying an adhesive coating onto the metalized film, by marrying a pressure-sensitive substrate to which adhesive coating is adhered, or by floodcoating the adhesive coating onto the metalized film and applying a removable barrier backing, or by floodcoating the adhesive coating onto a removable barrier backing and applying the metalized film.

Step 107. Removing the adhesive coating by removal of the pressure-sensitive substrate or the removable barrier backing.

Step 108. Rewinding for later use or remove.

Please note that step 107 need not come before step 108. In some applications, the user will stop after step 105 and rewind metalized film 20, and then perform steps 106 through 108 at a later time or in a different location. In other applications, the user will stop after step 106 and rewind, and then perform steps 107 and 108 at a later time or in a different location. The web roll, being either metalized film or metalized film married to a pressure-sensitive backing or a removable barrier backing, can be shipped to a final customer, who removes the adhesive coating as part of the final application. Accordingly, the adhesive coating can be removed in-line, or rewound and removed later.

In yet another embodiment, the initial process is stopped after step 105 and metalized film 20 is rewound for later use. Steps 106 through 108 are performed later, at the same or a different location.

Figure 6:
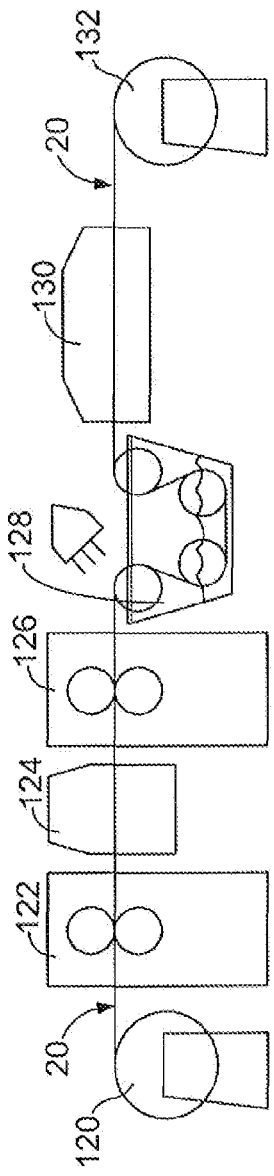
FIG. 6 is a drawing of the process for one embodiment of the present invention.

A drawing of one embodiment of the method of the present invention is shown in FIG. 6. Metalized film 20, in a roll, is mounted on unwinder 120. Metalized film 20 proceeds through UV coating unit 122, where protective coating 28 is selectively applied. Metalized film 20 then proceeds under UV lamp 124, where protective coating 28 is cured. Metalized film 20 then proceeds through caustic unit 126 for demetalizing, to rinse tank 128, and then through oven 130. Finally, metalized film is rewound on rewinder 132.

Figure 7:
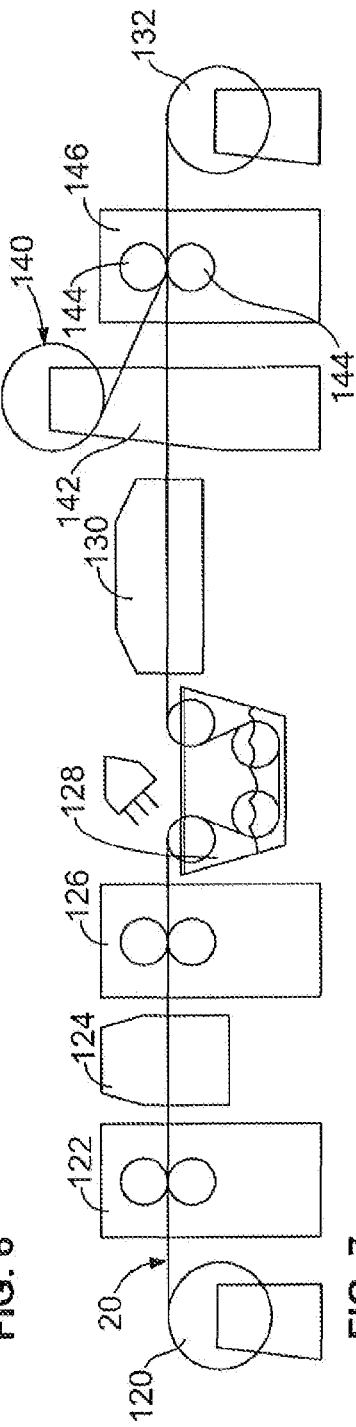
FIG. 7 is a drawing of the process of FIG. 6 with the addition of nipping a pressure sensitive barrier backing and rewinding the pressure sensitive barrier and the de-metalized film together.

Another embodiment is shown in FIG. 7. This process is identical to the process shown in FIG. 6 until metalized film 20 exits oven 130. At this point, pressure-sensitive substrate 140, carrying adhesive coating 30 and mounted on unwinder 142, is married to metalized film by nip rollers 144 in nip unit 146. The married combination of metalized film 20 and pressure-sensitive substrate 140 is then rewound on rewinder 132.

Figure 8:
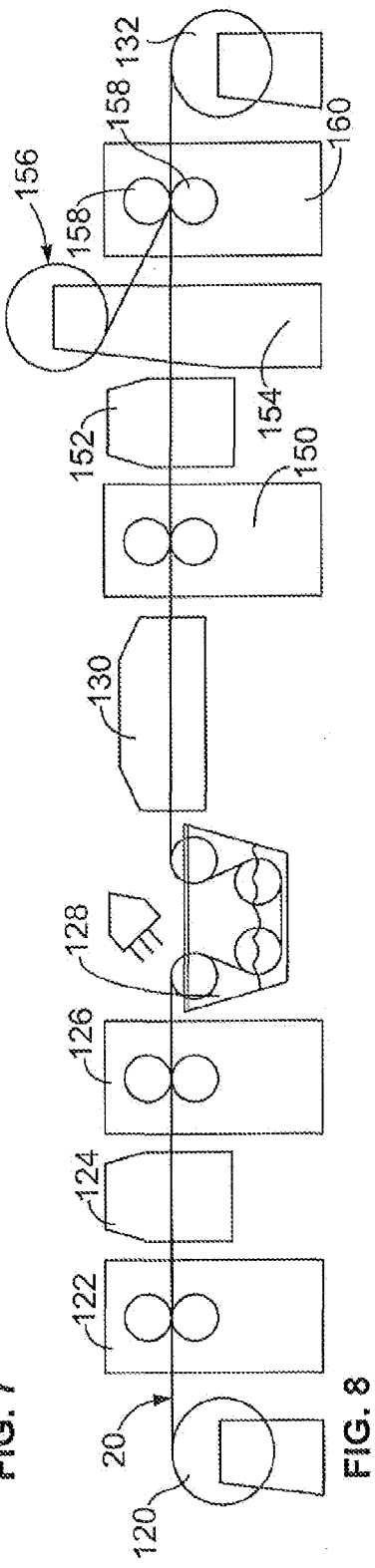
FIG. 8 is a drawing of the process of FIG. 6 with the addition of floodcoating an adhesive coating onto the de-metalized film and then nipping the removable barrier backing to the de-metalized film and rewinding them together.

Another embodiment is shown in FIG. 8. This process is identical to the process shown in FIG. 6 until metalized film 20 exits oven 130. At this point, UV adhesive coating 30 is applied by UV adhesive unit 150, which floodcoats adhesive coating 30 onto metalized film 20. Metalized film 20 then proceeds to UV lamp 152 for curing. Floodcoated metalized film 20 then proceeds through unwinder 154, on which is mounted a roll of removable barrier backing 156. Removable barrier backing 156 is married to metalized film 20 by nip rollers 158 in nip unit 160. The married combination of metalized film 20 and removable barrier backing 156 is then rewound on rewinder 132.

Figure 9:
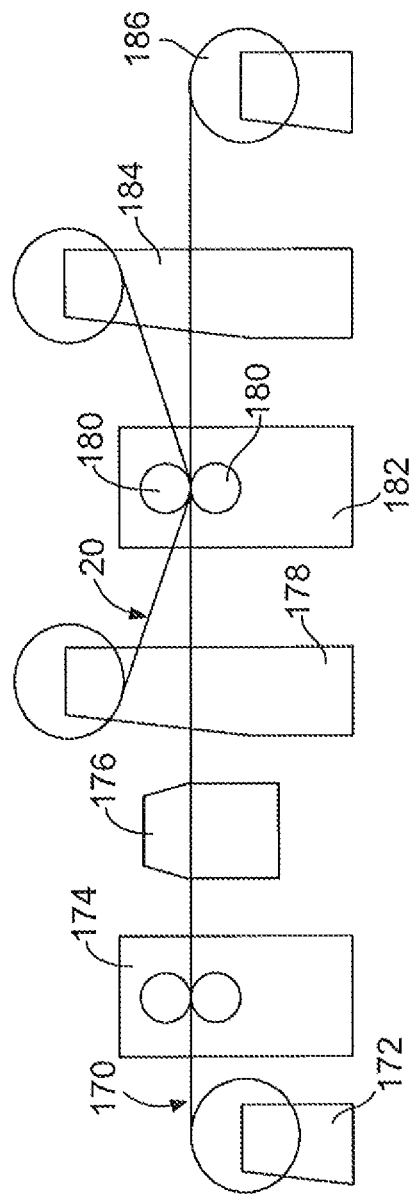
FIG. 9 is a drawing of another embodiment of the process of the present invention.

Another embodiment is shown in FIG. 9. This process can be performed at the end of the process depicted in FIG. 6, or can be performed off-line, as shown in FIG. 9. In this process, a substrate 170 is mounted in a roll on unwinder 172. Substrate 170 proceeds through UV adhesive unit 174, where adhesive coating 30 is applied to substrate 170 by floodcoating. Floodcoated substrate 170 proceeds through UV lamp 176 for curing. Metalized film 20, on which an image was prepared by the process shown in FIG. 6, is mounted on unwinder 178. Metalized film 20 is married to substrate 170 by nip rollers 180 in nip unit 182. Metalized film 20 is immediately pulled off substrate 170 by rewinder 184. Substrate 170 is rewound on rewinder 186.

Figure 10:
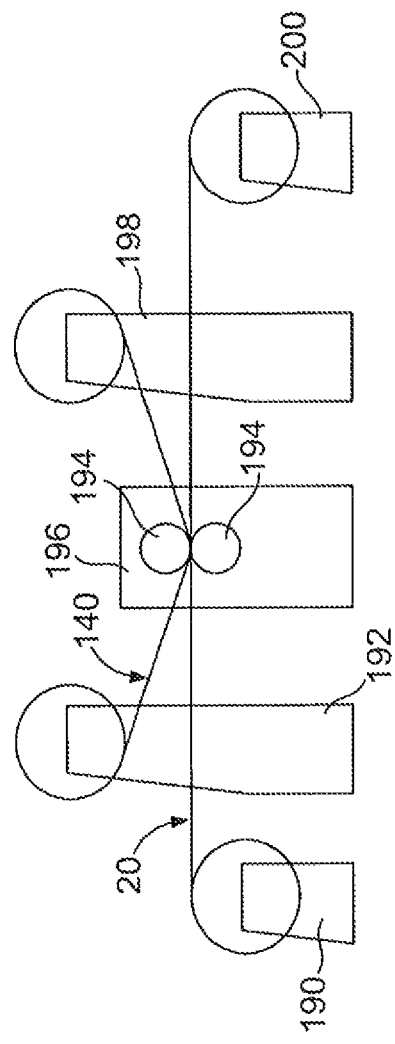
FIG. 10 is a drawing of yet another embodiment of the process of the present invention.

Another embodiment is shown in FIG. 10. This process can be performed at the end of the process depicted in FIG. 6, or can be performed off-line as shown in FIG. 10. In this process, metalized film 20, prepared by the process of FIG. 6, is mounted in a roll on unwinder 190. A roll of pressure sensitive substrate 140, carrying adhesive coating 30, is mounted on unwinder 192. Metalized film 20 and backing 140 are married by nip rollers 194 in nip unit 196. Backing 140 is immediately pulled of metalized film 20 by rewinder 198. Metalized film 20 is then rewound on rewinder 200.

In addition to the production of fine detailed images on metalized films, the method of present invention can be used for applications in which UV-based inks are not permitted. For example, the odor and/or residual chemical contamination emanating from some UV-based inks prevents the use of such inks in food packaging. The metalized films made by the present invention have no residual UV-based ink, as the UV layer is removed, so the metalized films can be used for food packaging, as well as for other applications in which odor must be minimized or eliminated.

Moreover, the present invention can be used for preparation of images on metalized films that will then be laminated to another film. Laminated films are used for many applications, in which the two or more laminates are selected to control permeability to light and moisture, to achieve a particular structure, or for marketability issues such as touch and feel. The coatings on metalized films of the prior art tended not to permit proper lamination. The coatings that caused delamination are not present on the metalized film of the present invention so the delamination problem is solved.

Additionally, lamination is sometimes required to protect the underlying image formed of ink. Since no ink remains on the metalized film of the present invention, an additional lamination step can be eliminated for applications of this nature.

The metalized film created by the method of the present invention can be used for various applications, including, but are not limited to, single or double-sided multi-layered printed circuit boards, holographic security identification badges with added detail to decrease likelihood of counterfeiting reproduction, security holograms such as labels and stickers, promotional holographic products, security tape and security labels, mechanical security seals, identification credentials, identification cards, printers and ribbons, parking permits such as stickers and hang tags, laminated labels and specialty products, solar panels, frozen microwavable food container subseptors, eye-catching food packaging, candy wrappers, miniature integrated drive electronics and panel connecter cables, attention-grabbing bags, and eye-catching laminate materials.

While preferred embodiments of the present invention are shown and described, it is envisioned that those skilled in the art may devise various modifications of the present invention without departing from the spirit and scope of the appended claims.

We claim:

1. A method of producing images on a metalized substrate, the method comprising the steps of:
    printing an image on a metalized film, the film comprising a substrate and a metalized coating on the substrate, by selectively applying a protective coating onto the metalized coating;
    curing the protective coating;
    applying a demetalizing solution onto the metalized film;
    rinsing the metalized film;
    drying the rinsed metalized film; and
    removing the protective coating by applying an adhesive coating onto the metalized film.

2. The method of claim 1, wherein the applying an adhesive coating step comprises marrying a pressure-sensitive substrate to the metalized film, the pressure-sensitive substrate having the adhesive coating adhered thereto.

3. The method of claim 2, further comprising the step of removing the adhesive coating.

4. The method of claim 1, wherein the applying an adhesive coating step comprises floodcoating the adhesive coating onto the metalized film and applying a removable barrier backing to the floodcoated adhesive coating.

5. The method of claim 4, further comprising the step of removing the adhesive coating.

6. The method of claim 1, wherein the applying an adhesive coating step comprises floodcoating the adhesive coating onto a removable barrier backing and applying the metalized film to the floodcoated adhesive coating.

7. The method of claim 6, further comprising the step of removing the adhesive coating.

8. The method of claim 1, wherein the substrate comprises at least one of polyester film and polyethylene terephthalate.

9. The method of claim 1, wherein the metalized coating comprises aluminum statically charged to the substrate.

10. The method of claim 1, wherein the protective coating comprises a UV-epoxy-based ink.

11. The method of claim 1, wherein the printing an image step comprises at least one of flexography, rotogravure, offset, dry offset, and screen printing.

12. The method of claim 1, wherein the metalized film comprises a roll feeding a web press.

13. The method of claim 1, further comprising the step of removing the adhesive coating.

14. A method of producing images on a metalized substrate, the metalized substrate comprising a substrate and a metalized coating on the substrate, an image having been printed on the metalized coating by the steps of selectively applying a protective coating to the metalized coating, the applied protective coating having been cured, applying a demetalizing solution to the metalized film, rinsing the metalized film, and drying the metalized film, the method comprising the steps of:
    removing the protective coating by applying an adhesive coating onto the metalized film and removing the adhesive coating.

15. The method of claim 14, wherein the applying an adhesive coating step comprises marrying a pressure-sensitive substrate to the metalized film, the pressure-sensitive substrate having an adhesive coating adhered thereto.

16. The method of claim 14, wherein the applying an adhesive coating step comprises floodcoating the adhesive coating onto the metalized film and applying a removable barrier backing to the floodcoated adhesive coating.

17. The method of claim 14, wherein the applying an adhesive coating step comprises floodcoating the adhesive coating onto a removable barrier backing and applying the metalized film to the floodcoating adhesive coating.

18. The method of claim 14, wherein the substrate comprises at least one of polyester film and polyethylene terephthalate.

19. The method of claim 14, wherein the metalized coating comprises aluminum statically charged to the substrate.

20. The method of claim 14, wherein the protective coating comprises a UV-epoxy-based ink.

21. The method of claim 14, wherein the image was printed by at least one of flexography, rotogravure, offset, dry offset, and screen printing.

22. A method of producing images on a metalized substrate, the metalized substrate comprising a substrate and a metalized coating on the substrate, an image having been printed on the metalized coating by the steps of selectively applying a protective coating to the metalized coating, the applied protective coating having been cured, applying a demetalizing solution to the metalized film, rinsing the metalized film, drying the metalized film, and applying an adhesive coating onto the metalized film, the method comprising the step of removing the protective coating by removing the adhesive coating.

23. The method of claim 22, wherein the adhesive coating was applied by marrying a pressure-sensitive substrate to the metalized film, the pressure-sensitive substrate having an adhesive coating adhered thereto.

24. The method of claim 22, wherein the adhesive coating was applied by floodcoating the adhesive coating onto the metalized film and applying a removable barrier backing to the floodcoated adhesive coating.

25. The method of claim 23, wherein the adhesive coating was applied by floodcoating the adhesive coating onto a removable barrier backing and applying the metalized film to the floodcoating adhesive coating.

26. The method of claim 23, wherein the substrate comprises at least one of polyester film and polyethylene terephthalate.

27. The method of claim 23, wherein the metalized coating comprises aluminum statically charged to the substrate.

28. The method of claim 23, wherein the protective coating comprises a UV-epoxy-based ink.

29. The method of claim 23, wherein the image was printed by at least one of flexography, rotogravure, offset, dry offset, and screen printing.

30. A method of producing images on a metalized substrate, the metalized substrate comprising a substrate and a metalized coating on the substrate, an image having been printed on the metalized coating by the steps of selectively applying a protective coating to the metalized coating, the applied protective coating having been cured, applying a demetalizing solution to the metalized film, rinsing the metalized film, and drying the metalized film, the method comprising the steps of:
   floodcoating the adhesive coating onto the metalized film;
   applying a removable barrier backing to the floodcoated adhesive coating; and
   removing the adhesive coating.

31. A method of producing images on a metalized substrate, the metalized substrate comprising a substrate and a metalized coating on the substrate, an image having been printed on the metalized coating by the steps of selectively applying a protective coating to the metalized coating, the applied protective coating having been cured, applying a demetalizing solution to the metalized film, rinsing the metalized film, drying the metalized film, floodcoating the adhesive coating onto the metalized film, and applying a removable barrier backing to the floodcoated adhesive coating, the method comprising the step of removing the adhesive coating.

32. A method of producing images on a metalized substrate, the method comprising the steps of:
   printing an image on a metalized film, the film comprising a substrate and a metalized coating on the substrate, by selectively applying a protective coating onto the metalized coating;
   curing the protective coating;
   applying a demetalizing solution onto the metalized film;
   rinsing the metalized film;
   drying the rinsed metalized film;
   floodcoating the adhesive coating onto the metalized film;
   applying a removable barrier backing to the floodcoated adhesive coating; and
   removing the adhesive coating.

33. A method of producing images on a metalized substrate, the method comprising the steps of:
   printing an image on a metalized film, the film comprising a substrate and a metalized coating on the substrate, by selectively applying a protective coating onto the metalized coating;
   curing the protective coating;
   applying a demetalizing solution onto the metalized film;
   rinsing the metalized film;
   drying the rinsed metalized film;
   applying a pressure-sensitive substrate to the metalized film, the pressure-sensitive substrate having an adhesive coating adhered thereto; and
   removing the adhesive coating.

* * * * *

UNITED STATES PATENT AND TRADEMARK OFFICE
CERTIFICATE OF CORRECTION

PATENT NO. : 8,628,679 B2  Page 1 of 1
APPLICATION NO. : 13/010341
DATED : January 14, 2014
INVENTOR(S) : Ronald F. DeSanto, Jr., Norma D. Kammerer and Anton Zagajowski, III It is certified that error appears in the above-identified patent and that said Letters Patent is hereby corrected as shown below:

On the Title Page

Item (12) "DeSanto et al." should be -- DeSanto, Jr. et al. --

Item (75) Inventors: "Ronald F. DeSanto, Darien, IL (US); Norma D. Kammerer, Bloomingdale, IL (US); Anton Zagajowski, III, Yorkville, IL (US)" should be -- Ronald F. DeSanto, Jr., Darien, IL (US); Norma D. Kammerer, Bloomingdale, IL (US); Anton Zagajowski III, Yorkville, IL (US) --

Signed and Sealed this
Twenty-fifth Day of March, 2014

Michelle K. Lee
*Deputy Director of the United States Patent and Trademark Office*